(12) United States Patent
Barancyk

(10) Patent No.: US 7,754,787 B2
(45) Date of Patent: *Jul. 13, 2010

(54) CURABLE FILM-FORMING COMPOSITIONS CONTAINING COLLOIDAL PARTICLE SOLS HAVING IMPROVED APPEARANCE AND MAR AND SCRATCH RESISTANCE

(75) Inventor: Steven V. Barancyk, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 31 days.

This patent is subject to a terminal disclaimer.

(21) Appl. No.: 11/847,427

(22) Filed: Aug. 30, 2007

(65) Prior Publication Data

US 2009/0062461 A1    Mar. 5, 2009

(51) Int. Cl.
- C08K 9/00 (2006.01)
- C09J 4/00 (2006.01)
- C08G 18/62 (2006.01)

(52) U.S. Cl. .................. 523/200; 523/177; 524/40; 524/216; 524/274

(58) Field of Classification Search .............. 428/423.1, 428/423.7, 482, 522; 525/452; 524/588, 524/589, 40, 216, 274; 528/29; 427/407.1, 427/387, 419.2; 523/177, 210, 200

See application file for complete search history.

(56) References Cited

U.S. PATENT DOCUMENTS

| | | | | |
|---|---|---|---|---|
| 4,491,508 A | * | 1/1985 | Olson et al. | 522/44 |
| 4,681,811 A | * | 7/1987 | Simpson et al. | 428/413 |
| 5,853,809 A | * | 12/1998 | Campbell et al. | 427/407.1 |
| 6,225,434 B1 | * | 5/2001 | Sadvary et al. | 427/407.1 |
| 6,790,904 B2 | | 9/2004 | White et al. | 542/588 |
| 6,844,374 B2 | * | 1/2005 | Jin et al. | 522/79 |
| 6,916,368 B2 | * | 7/2005 | Vanier et al. | 106/483 |
| 7,030,058 B1 | * | 4/2006 | Nakabayashi | 502/401 |
| 7,172,809 B2 | * | 2/2007 | Barancyk et al. | 428/323 |
| 2004/0044165 A1 | * | 3/2004 | Barancyk et al. | 528/25 |
| 2004/0162389 A1 | * | 8/2004 | Mayo et al. | 525/123 |
| 2004/0162398 A1 | * | 8/2004 | Mayo et al. | 525/456 |
| 2006/0020097 A1 | * | 1/2006 | Briehn et al. | 528/25 |
| 2007/0196658 A1 | * | 8/2007 | Briehn et al. | 428/405 |

* cited by examiner

*Primary Examiner*—Vasu Jagannathan
*Assistant Examiner*—Hannah Pak
(74) *Attorney, Agent, or Firm*—Diane R. Meyers

(57) ABSTRACT

Curable film-forming compositions comprising a film-forming resin and an organic sol of particles are provided. The sol of particles may be prepared by providing a suspension of particles in an aqueous medium; adding a first organic liquid compatible with the aqueous medium to form an admixture; reacting the particles with a first and a second modifying compound; adding a second organic liquid compatible with the liquid portion of the admixture wherein the second organic liquid is different from the first organic liquid; and maintaining the admixture at a temperature and pressure and for a time sufficient to substantially remove the water and the first organic liquid. The film-forming resin comprises an active hydrogen-functional polymer having low functionality; i.e., a functional group equivalent weight greater than 380 g/equivalent, and a crosslinking agent, yet surprisingly offers outstanding mar and scratch resistance.

20 Claims, No Drawings

CURABLE FILM-FORMING COMPOSITIONS CONTAINING COLLOIDAL PARTICLE SOLS HAVING IMPROVED APPEARANCE AND MAR AND SCRATCH RESISTANCE

FIELD OF THE INVENTION

The present invention relates to curable film-forming compositions containing colloidal particles, in particular, curable film-forming compositions containing organic sols which are prepared from aqueous dispersions.

BACKGROUND OF THE INVENTION

Colloidal dispersions are used in coatings inter alia to improve mar and scratch resistance, to improve storage stability of the coating compositions, to assist in rheology control of coatings during application to a substrate, and to improve orientation of pigment particles in coatings containing metallic and other effect pigments. The favorable effects of the colloidal particles are due in large part to the very small size of the dispersed particles, which is less than the wavelength of light. This very small particle size can prevent the particles from scattering light, thereby preventing haziness and adverse color effects that can occur from light scattering in an applied coating. The small particle size also can promote stability of the colloidal dispersions as well as the stability of the coating compositions that contain such dispersions.

Some very small particles, for example silica particles, can associate with one another, forming agglomerates which effectively act as large particles in coatings. Therefore, some of the above-mentioned benefits of the small particle size may be lost. Water molecules in an aqueous carrier successfully compete with the neighboring particles for interaction with the polar groups. Although the stability of the suspension can be affected by factors such as pH and the presence of cations, particularly polyvalent cations, the incorporation of aqueous dispersions into aqueous coating compositions is relatively straightforward. However, in organic coatings or coatings with a high level of non-polar components, the particles have an increased tendency to agglomerate. Since many coating compositions are solventborne, it is desirable to provide a means of incorporating these colloidal dispersions of particles without agglomeration of the particles. In response to this need, sols of particles have been developed that can be used in solventborne and waterborne film-forming compositions.

Historically, highly functional resins offered high mar and scratch resistance in coating compositions, but often had poor appearance properties. Lowering functionality often improved appearance, but at the expense of mar and scratch resistance. Low functionality resins were considered less desirable because of multiple poor film properties, including mar and scratch resistance, due to low crosslink density. Likewise, some two-pack compositions (such as acid/epoxy-cured and isocyanate/hydroxyl-cured systems) demonstrate acceptable appearance but with compromised mar and scratch resistance. While mar and scratch resistance of coating compositions may often be improved by the addition of particles, such improvements may be limited to very particular resin compositions and unobserved with others.

It would be desirable to improve the mar and scratch resistance and appearance of existing film-forming compositions using low functionality resins and readily available crosslinking agents without detrimentally affecting other physical properties of the resulting coatings.

SUMMARY OF THE INVENTION

In a curable film-forming composition comprising:
a) a film-forming resin; and
b) a sol of particles suspended in an organic medium, wherein said sol of particles is prepared by a method comprising:
  i) providing a suspension of particles in an aqueous medium;
  ii) adding a first organic liquid compatible with the aqueous medium to form an admixture;
  iii) reacting the particles in the admixture with a first modifying compound, wherein the first modifying compound comprises a group that does not react with the particles and a functional group capable of reacting with functional groups on the particles;
  iv) reacting the particles with a second modifying compound, wherein the second modifying compound is different from the first and comprises a hydrophobic group and a functional group capable of reacting with functional groups on the particles; and
  v) adding a second organic liquid compatible with the liquid portion of the admixture either before or after the particles are reacted with the second modifying compound, wherein the second organic liquid is different from the first organic liquid used in step ii);

wherein when the second organic liquid is added to the admixture before the particles are reacted with the second modifying compound, the admixture is maintained at a temperature and pressure and for a time sufficient to substantially remove the water and the first organic liquid added in step ii) before reacting the particles with the second modifying compound, the present invention provides an improvement wherein the film-forming resin of a) comprises a polymer containing active hydrogen functional groups and having a functional group equivalent weight greater than 380 g/equivalent based on resin solids of the polymer itself, and a crosslinking agent reactive with the functional groups on the polymer.

In a curable film-forming composition comprising:
a) a film-forming resin; and
b) a sol of particles suspended in an organic medium, said sol of particles comprising particles that have been reacted with:
  i) a first modifying compound comprising a group that does not react with the particles and a functional group capable of reacting with functional groups on the particles; and
  ii) a second modifying compound, wherein the second modifying compound is different from the first and comprises a hydrophobic group and a functional group capable of reacting with functional groups on the particles, the present invention further provides an improvement wherein the film-forming resin of a) comprises a polymer containing active hydrogen functional groups and having a functional group equivalent weight greater than 380 g/equivalent based on resin solids of the polymer itself, and a crosslinking agent reactive with the functional groups on the polymer.

In particular embodiments of the present invention as described above, the film-forming resin of a) comprises a polymeric polyol having a hydroxyl equivalent weight greater than 380 g/equivalent, and a crosslinking agent reactive with the polymeric polyol.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The various embodiments and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their C1-C5 alkyl esters, lower alkyl-substituted acrylic acids, e.g., C1-C5 substituted acrylic acids, such as methacrylic acid, ethacrylic acid, etc., and their C1-C5 alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The present invention is directed to curable film-forming compositions, in particular, curable film-forming compositions comprising a film-forming resin and a sol of particles suspended in an organic medium. In certain embodiments, the present invention provides an improvement wherein the film-forming resin comprises a polymer containing active hydrogen functional groups and having a functional group equivalent weight greater than 380 g/equivalent based on resin solids of the polymer itself, and a crosslinking agent reactive with the functional groups on the polymer.

The sol of particles used in the curable film-forming compositions comprises particles that have been reacted with: (a) a first modifying compound comprising a group that does not react with the particles and a functional group capable of reacting with functional groups on the particles; and (b) a second modifying compound, wherein the second modifying compound is different from the first modifying compound, and comprises a hydrophobic group and a functional group capable of reacting with functional groups on the particles. The first and second modifying compounds are described in detail below.

The sol of particles suspended in an organic medium may be prepared by a process comprising:
  a) providing a suspension of particles in an aqueous medium;
  b) adding a first organic liquid compatible with the aqueous medium to form an admixture;
  c) reacting the particles in the admixture with a first modifying compound, wherein the first modifying compound comprises a group that does not react with the particles and a functional group capable of reacting with functional groups on the particles;
  d) reacting the particles with a second modifying compound, wherein the second modifying compound is different from the first and comprises a hydrophobic group and a functional group capable of reacting with functional groups on the particles; and
  e) adding a second organic liquid compatible with the liquid portion of the admixture either before or after the particles are reacted with the second modifying compound, wherein the second organic liquid is different from the first organic liquid used in step b);
  wherein when the second organic liquid is added to the admixture before the particles are reacted with the second modifying compound, the admixture is maintained at a temperature and pressure and for a time sufficient to substantially remove the water and the first organic liquid added in step b) before reacting the particles with the second modifying compound.

In the first step of this process, a suspension of particles in an aqueous medium is provided. By "aqueous medium" is meant a liquid medium that is primarily water. The aqueous medium may comprise minor amounts (i.e., up to 50 percent by weight) of other materials, either organic or inorganic, that are substantially miscible with or soluble in water. The term "suspension" or "sol" as used herein is believed to be a stable, two-phased translucent or opaque system in which the particles are in the dispersed phase and the aqueous medium defined above is the continuous phase. By "sol" is additionally meant a mixture of one or more types of particles in a liquid, wherein the particles are larger than individual molecules, but are small enough that, in a normal earth surface gravitational field, they remain in uniform suspension indefinitely without the application of any external mechanical, thermal, or other force. Such sols are also referred to as colloidal solutions. See, for example, page 2 of *Sol-Gel Science: The Physics and Chemistry of Sol-Gel Processing*, C. Jeffrey Brinker, Academic Press, 1990.

The particles can be formed from materials comprising polymeric organic materials, polymeric and nonpolymeric inorganic materials, and/or composite materials. By "polymer" is meant a polymer including homopolymers and copolymers, prepolymers, and oligomers. "Polymeric inorganic materials" include polymeric materials having backbone repeat units based on one or more elements other than carbon. By "composite material" is meant a combination of two or more differing materials. The particles formed from composite materials typically, though not necessarily, have a hardness at their surface that is different from the hardness of the internal portions of the particle beneath the surface. For example, a particle can be formed from a primary material that is coated, clad, or encapsulated with one or more secondary materials to form a composite particle that has a softer surface. Particles formed from composite materials can also be formed from a primary material that is coated, clad, or encapsulated with a different form of the same primary material. For information on particles useful in this method, see G. Wypych, *Handbook of Fillers*, $2^{nd}$ Ed. (1999) at pages 15-202.

The particles may comprise inorganic oxides, for example, metal oxides such as zinc oxide, alumina, ceria, titania, zirconia, yttria, cesium oxide; inorganic oxides; metal nitrides such as boron nitride; metal carbides; metal sulfides such as molybdenum disulfide, tantalum disulfide, tungsten disulfide, and zinc sulfide; metal silicates including aluminum silicates and magnesium silicates such as vermiculite; metal borides; hydroxides; metal carbonates; and silica. Mixtures of such materials also can be used.

The particles can comprise, for example, a core of essentially a single inorganic oxide such as silica in colloidal, fumed or amorphous form; alumina or colloidal alumina; titanium dioxide; cesium oxide; yttrium oxide; colloidal yttria; zirconia, e.g., in colloidal or amorphous form; and mixtures of any of the foregoing; or an inorganic oxide of one type upon which is deposited an organic oxide of another type.

Other nonpolymeric inorganic materials include graphite, metals such as molybdenum, platinum, palladium, nickel, aluminum, zinc, tin, tungsten, copper, gold, silver, alloys, and mixtures of metals.

Organic polymeric particles are limited to those that are insoluble in and impervious to the organic liquid in which they will be dispersed. By "impervious" is meant the organic particle will not be chemically altered or will not swell due to penetration of the liquid into the polymer network.

The particles may comprise silica, alumina, ceria, titania, zirconia, yttria, and/or cesium oxide. Often the particles comprise silica, which can be in the form of colloidal silica. The average diameter of the particles can range between 1 and 1000 nanometers prior to forming the sol, such as 5 to 250 nanometers.

The shape (or morphology) of the particles can vary depending upon the intended application of the film-forming composition of the present invention. For example, generally spherical morphologies such as solid beads, microbeads, or hollow spheres can be used, as well as particles that are cubic, platy, or acicular (elongated or fibrous). Additionally, the particles can have an internal structure that is hollow, porous, or void free, or a combination of any of the foregoing; e.g., a hollow center with porous or solid walls.

It will be recognized by those skilled in the art that mixtures of one or more types of particles and/or particles having different average particle sizes may be incorporated into the sols to impart the desired properties and characteristics to the compositions in which they are to be used.

The particles may be obtained in a dry form and dispersed into an aqueous medium by any dispersion means known to those skilled in the art. Alternatively, the particles may be obtained from a supplier already dispersed in an aqueous carrier. Examples of ready-made dispersions include the SNOWTEX® line of products available from Nissan Chemical Industries, Ltd., and NALCO 1034, available from Nalco.

The particles may have functional groups on their surface, such as, for example, hydroxyl groups, with which modifying compounds may be reacted.

Optionally, the process of preparing the sol of particles further comprises a step immediately following step a) of maintaining the suspension at a temperature and pressure and for a time sufficient to remove 10 to 15 percent by weight, based on the total weight of the suspension, of volatile components in the suspension, including water.

Step (b) of the method comprises adding a first organic liquid compatible (i.e., substantially miscible) with the aqueous medium used in step (a) to form an admixture. By "compatible" is additionally meant that the organic liquid is able to come into intimate contact with the particles which are suspended in the aqueous medium and is able to at least partially replace the physical and chemical associations between the particles and the aqueous medium. The "admixture" is typically in the form of a suspension of particles in the liquid medium. The organic liquid is selected so that during subsequent distillation of the admixture, water comprises at least part of the distillate, and so that during removal of water by distillation, the particles remain dispersed and do not flocculate. The organic liquid used in step (b) may comprise glycol ethers, alcohols, esters, ketones, and/or aromatic hydrocarbons. Suitable specific examples include propylene glycol monomethyl ether, n-propanol, isopropanol, and n-butanol. The organic liquid used in step (b) often comprises isopropanol. The concentration of particles in the admixture formed in step (b) can be less than or equal to 15 percent by weight, or less than or equal to 10 percent by weight, based on the total weight of the admixture.

In step (c) of the method described above, the particles are reacted with a first modifying compound, wherein the first modifying compound comprises a group that does not react with the particles and a functional group capable of reacting with functional groups on the particles. Groups that do not react with the particles may include, for example, ethylenically unsaturated groups such as vinyl, allyl, acrylate, and methacrylate groups, and the like. Functional groups capable of reacting with functional groups on the particles may include, inter alia, alkoxy groups. The first modifying compound comprises a compound having the structure:

$$F-L-Z$$

wherein F comprises a functional group that will react with the particle surface; Z comprises an unsaturated group; and L is a group that links F and Z. The Z moiety can be introduced to the particle in any manner known in the art. For example, the Z moiety may be part of a compound that, by itself, reacts with the particle, (i.e. contains an F moiety) such as a compound that contains a trialkoxy silane.

Alternatively, a compound containing a Z moiety can be reacted with another compound that contains an F moiety, either before or after the F moiety has reacted with the particle. This can be done by any means known in the art, by selecting the appropriate L moiety to bring together the F and Z moieties. For example, a trialkoxy silane wherein the fourth substituent has a first functional group can be reacted with a compound containing both a "Z" moiety and a second functional group; the first and second functional groups are selected so as to be reactive with each other. Upon reaction, the F and Z moieties are united. Any pair of functional groups can be used. For example, if one functional group is an epoxy, the other can be an amine, a carboxylic acid or a hydroxy; if one functional group is an amine, the other can be an epoxy, isocyanate or carboxylic acid; if one functional group is an isocyanate, the other can be an amine or hydroxy; and if one functional group is an acrylate, the other can be an amine.

Often the first modifying compound comprises a compound having the structure:

$$Si(OR)_3\text{---}(CH_2)_n\text{---}Z$$

wherein R comprises an alkyl group having 1 to 39 carbons, such as 1 or 2 carbons, Z comprises an ethylenically unsaturated group, and n is 0, 1, 2, or 3. "Alkyl" refers herein to carbon-containing groups having the specified number of carbon atoms, which groups can be cyclic or aliphatic, branched or linear, substituted or unsubstituted. Typically, the first modifying compound comprises a (meth)acryloxypropyl trialkoxy silane such as acryloxypropyl trimethoxy silane. In step (d) of the method described above, the particles are reacted with a second modifying compound, wherein the second modifying compound is different from the first and comprises at least one hydrophobic group and at least one functional group capable of reacting with functional groups on the particles. As used in this context, by "hydrophobic" is meant to imply aliphatic, cycloaliphatic, aromatic, or related functionality that is generally known to be low in polarity.

The second modifying compound comprises a compound different from the first modifying compound and having the structure:

$$F'-L'-Z'$$

wherein F' comprises a functional group that will react with the particle surface; Z' comprises a hydrophobic group; and L' is a group that links F' and Z'. The Z' moiety can be introduced to the particle in any manner known in the art as above.

The second modifying compound may comprise a compound having the structure:

$$Si(OR)_3\text{---}(CH_2)_n\text{---}Z'$$

wherein R comprises an alkyl group having 1 to 39 carbons, such as 1 or 2 carbons, Z' comprises a hydrophobic group, e.g., a moiety that decreases the surface tension of the particle to which it is attached, and n is 0, 1 or 2. It will be appreciated that at least one of the alkoxy groups attached to the Si atom reacts with a functional group on the surface of the particle; in the case of silica particles, the alkoxy group reacts with a silanol group on the particle surface. In one case, Z' does not contain any aromaticity and in another case, Z' does not have a nitrogen group. The Z' moiety can have no functional groups, or can have one or more functional groups. In one case, two or more functional groups are present in the Z' moiety. The functional groups, if present, can be selected based on their ability to react with a crosslinking agent used in the curable film-forming composition of the present invention. This can provide retained mar and/or scratch resistance because the particle will covalently bond with the resin/crosslinker at the surface of the film. For certain applications, such reaction may be undesirable and the Z' moiety does not contain any functional or reactive group.

Any Z' moiety can be used in the second modifying compound, and will generally fall into one of three categories: a long chain alkyl group; a fluorocarbon-containing material; and a silane to which is attached at least two methyl groups. "Long chain" as used in this context refers to four or more carbon atoms, and a fluorocarbon-containing material refers to a material comprising at least one $CF_3$ group. The long chain alkyl group can be linear or branched. The Z' moiety can be introduced to the particle in any manner known in the art. For example, the Z' moiety may be part of a compound that, by itself, reacts with the particle such as a compound that contains a trialkoxy silane.

Examples of compounds having long alkyl chains are those wherein Z' is —$(CH_2)_{n1}$—$CH_3$, and $n_1$ is 1 to 30, such as 7 to 17. In this case, the total of n and $n_1$ is three or greater. Specific examples include octyltrimethoxy silane, octyltriethoxy silane, and octadecyltriethoxy silane. In another particular case that introduces a long alkyl chain, Z' is

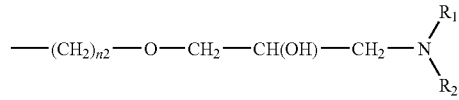

$n_2$ is 1 to 3 and $R_1$ and $R_2$ are the same or different and $R_1$ can be hydrogen or an alkyl group having 1 to 30 carbons and $R_2$ comprises an alkyl group having 4 to 30 carbons. For example, $R_1$ can be H and $R_2$ can be $C_6H_{13}$, $C_8H_{17}$ or $C_{12}H_{25}$, or both $R_1$ and $R_2$ can be $(C_4H_9)$.

Examples of compounds having fluorocarbon-containing moieties include but are not limited to those wherein n is 1 or 2, Z' is —$(CF_2)_m$—$CF_3$ and m is 0 to 30, such as 7. Perfluoro alkyl trialkoxy silanes fall within this category, such as perfluorooctyl triethoxy silane, fluoropropyltrimethoxy silane, and perfluorodecyl triethoxy silane.

Examples of compounds having dimethylsilane moieties include those wherein n is zero, Z' is —$(CH_2)_{n3}$—$(Si(CH_3)_2)$—$O)_{m1}$—$Si(CH_3)_3$, $n_3$ is 0 to 17, such as 2, and $m_1$ is between 1 and 50, such as between 1 and 10. It will be appreciated that the examples listed above are not limiting.

Step (e) of the process of preparing the sol of particles comprises adding a second organic liquid that is compatible with the liquid portion of the admixture. The second organic liquid is different from the first organic liquid used in step b). The second organic liquid may comprise glycol ethers, alcohols, esters, ketones, polymers, and/or aromatic hydrocarbons. When necessary, the second organic liquid may further comprise a dispersing aid. Suitable glycol ethers include ethylene glycol monomethyl ether, propylene glycol monomethyl ether, propylene glycol monophenyl ether, propylene glycol monoethyl ether, dipropylene glycol monomethyl ether, dipropylene glycol dimethyl ether, dipropylene glycol monobutyl ether, tripropylene glycol methyl ether, tripropylene glycol n-butyl ether, and/or tripropylene glycol t-butyl ether. Alcohols such as those listed above with respect to the first organic liquid are also suitable, as long as the one used is different from the first organic liquid. Often the second organic liquid is an alcohol, such as 2-butoxyethanol. Ketones include methylethyl ketone, methyl isobutyl ketone, methyl amyl ketone, cyclohexanone and isophorone.

The polymer that may be added as the second organic liquid can form a homogeneous mixture with other organic liquids in the admixture, while maintaining the particles in stable suspension. The polymer may comprise a polysiloxane, a polycarbonate, a polyurethane, a polyepoxide, an acrylic, a polyester, an acetoacetate, and/or a polyanhydride. The polymers may be linear, branched, dendritic, or cyclic.

The admixture is maintained at a temperature for a time sufficient to substantially react the first and second modifying compounds with the functional groups on the particles. By "substantially react" is meant that at least 90 percent of a stoichiometric amount of the first and second modifying compounds react with the functional groups on the particles. The temperature may vary depending on the nature of the liquids used in the admixture.

The method may further comprise an optional distillation step, wherein the admixture is maintained at a temperature and pressure and for a time sufficient to substantially remove the water and the first organic liquid added in step b). By "substantially remove" is meant that greater than 50 percent by weight of the original amounts of water and first organic liquid in the admixture are removed. Again, the temperature and pressure may vary depending on the nature of the liquids used in the admixture, but typically the admixture is maintained at a temperature of ambient to 100° C. and at a pressure of 10 mm Hg to 300 mm Hg.

The sol of particles may alternatively be prepared by a process comprising:

a) providing a suspension of particles in an aqueous medium;

b) adding a first organic liquid compatible with the aqueous medium to form an admixture;

c) reacting the particles with a first modifying compound, wherein the first modifying compound comprises at least one group that does not react with the particles and at least one functional group capable of reacting with functional groups on the particles;

d) adding a second organic liquid compatible with the liquid portion of the admixture wherein the second organic liquid is different from the first organic liquid used in step b);

e) maintaining the admixture at a temperature and pressure and for a time sufficient to substantially remove the water and the first organic liquid added in step b);

f) reacting the particles with a second modifying compound wherein the second modifying compound is different from the first and comprises at least one hydrophobic group and at least one functional group capable of reacting with functional groups on the particles; and g) maintaining the admixture at a temperature and for a time sufficient to substantially react the second modifying compound with the functional groups on the particles. Various process conditions and components used such as organic liquids, modifying compounds, etc. may be the same as those described earlier.

Note that the order of process steps may be altered with the same results and additional steps may be added as necessary. Note additionally that steps may be performed sequentially or two or more steps may be combined and performed simultaneously.

As noted above, the present invention provides curable film-forming compositions. In certain embodiments a film-forming composition comprises:

a) a film-forming resin; and b) a sol of particles suspended in an organic medium, wherein the sol of particles is prepared by any of the methods described above. The present invention provides the improvement wherein, in certain embodiments, the film-forming resin of a) comprises a polymer containing active hydrogen functional groups and having a functional group equivalent weight greater than 380 g/equivalent based on resin solids of the polymer itself, and a crosslinking agent reactive with the functional groups on the polymer. In particular embodiments of the present invention, the film-forming resin of a) comprises a polymeric polyol having a hydroxyl equivalent weight greater than 380 g/equivalent based on resin solids of the polymeric polyol itself, and a crosslinking agent reactive with the polymeric polyol.

The film-forming resin in the composition of the present invention may be solventborne or waterborne, and comprises a polymer containing active hydrogen functional groups and having a functional group equivalent weight greater than 380 g/equivalent based on resin solids of the polymer itself, and a crosslinking agent reactive with the functional groups on the polymer.

The film-forming resin may be any of a variety of polymers well-known in the coatings art. In certain embodiments of the invention the film-forming resin can comprise acrylic polymers, polyesters, polyurethanes, polyamides, polyethers, polysilanes, and/or silyl ether polymers with one or more different types of active hydrogen functional groups, such as pendant and/or terminal hydroxyl groups, carboxylic acid groups, amine groups, thiol groups, carbamate groups, urethane groups, amide groups, and/or urea groups. Most often the functional groups comprise hydroxyl groups. Generally these polymers can be any polymers of the types mentioned above, made by any method known to those skilled in the art where the polymers are water dispersible, emulsifiable, or of limited water solubility. Often acrylic polyols are used. Optionally, one or more separate polymers containing other functional groups may also be used in addition to polymeric polyols and blended therewith.

The amount of the polymer present in the film-forming resin a) generally ranges from 10 to 90 percent by weight, or 20 to 80 percent by weight, or 60 to 70 percent by weight, based on the total weight of resin solids (crosslinking agent plus all polymers containing functional groups) in the film-forming resin.

The crosslinking agent will be selected to be reactive with the active hydrogen groups of the polymer. The crosslinking agent can be any of a variety of crosslinking agents known in the art. For example, the crosslinking agent can comprise, inter alia, polyepoxides, triazines, aminoplasts, polyisocyanates, including blocked isocyanates, beta-hydroxyalkylamides, organometallic acid-functional materials, polyamines, polyamides and mixtures of any of the foregoing.

Conventional aminoplast crosslinking agents are well known in the art and are described in U.S. Pat. No. 5,256,452; Col. 9, Lines 10-28. Useful aminoplast resins are based on the addition products of formaldehyde with an amino- or amido-group carrying substance. Condensation products obtained from the reaction of alcohols and formaldehyde with melamine, urea or benzoguanamine are most common and most often used herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, and 2-mercapto-4,6-diaminopyrimidine. The aminoplast crosslinking agent may be monomeric or polymeric and may be partially or fully alkylated.

An example of a particularly suitable aminoplast is RES-IMENE 741, commercially available from INEOS Americas LLC.

The amount of the crosslinking agent generally ranges from 10 to 90 percent by weight, or 20 to 80 percent by weight, or 30 to 40 percent by weight, based on the total weight of resin solids (crosslinking agent plus all polymers containing functional groups) in the film-forming resin.

The sol of particles used in the composition of the present invention may be added to the composition neat during the formulation thereof, or they may be mixed with any of the resinous or compatible solvent components of the composition either singly or in any combination before incorporation into the final formulation.

Other optional ingredients, such as catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from about 0.1 to 5 percent by weight based on total weight of resin solids of the film-forming resin. Suitable catalysts include acid functional catalysts known to those skilled in the art as useful in aminoplast-cured compositions, such as para-toluenesulfonic acid, dodecylbenzene sulfonic acid, and the like.

The coatings of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable film-forming compositions of the present invention may contain color pigments conventionally used in surface coatings and may be used as high gloss monocoats; that is, high gloss pigmented coatings. By "high gloss" it is meant that the cured coating has a 200 gloss and/or a DOI ("distinctness of image") measurement of at least about 80 as measured by standard techniques known to those skilled in the art. Such standard techniques include ASTM D523 for gloss measurement and ASTM E430 for DOI measurement.

The curable film-forming compositions of the present invention may be used as one or more layers of a multi-layer composite coating composition, such as a color-plus-clear composite coating, as noted below. For example, the composition may serve as a colored base coat and/or as a transparent topcoat. The composition may also be used in combination with other coatings in a composite coating composition.

The curable film-forming compositions of the present invention may be curable at ambient temperatures or elevated temperatures, depending on the crosslinking chemistry employed. The film-forming compositions of the present invention alternatively may be used as automotive primers, electrodepositable primers, base coats, clear coats, and/or monocoats, as well as in industrial and other applications. The compositions may be easily prepared by simple mixing of the ingredients, using formulation techniques well known in the art.

The compositions of the present invention may be applied over any of a variety of substrates such as metallic, glass, wood, and/or polymeric substrates, and can be applied by conventional means including brushing, dipping, flow coating, spraying and the like, but they are most often applied by spraying. The usual spray techniques and equipment for air spraying and electrostatic spraying and either manual or automatic methods can be used. Suitable substrates include metal substrates such as ferrous metals, zinc, copper, magnesium, aluminum, aluminum alloys, and other metal and alloy substrates typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions of the present invention may also be applied over elastomeric or plastic substrates such as those that are found on motor vehicles. By "plastic" is meant any of the common thermoplastic or thermosetting synthetic non-conductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

The composition of the present invention may be applied directly to the substrate (including an electrocoated substrate) as part of a primeness composite system, or it may be applied on top of a primer or other intermediate coating. In certain embodiments, the present invention is directed to multi-component composite coating compositions comprising a basecoat deposited from a colorant-containing base coating composition, which can comprise any of the aforementioned curable coating compositions, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above. It should be understood that one or both of the base coating composition and the top coating composition can be formed from the curable coating compositions of the present invention.

Where the basecoat is not formed from a composition of the present invention (but the topcoat is formed from a curable coating composition of the present invention) the coating composition of the basecoat in the color-plus-clear system can be any of the compositions useful in coatings applications, particularly automotive applications. The coating composition of the basecoat can comprise a resinous binder and a pigment to act as the colorant, as well as optional additives well known in the art of coating compositions. Nonlimiting examples of resinous binders are acrylic polymers, polyesters, alkyds, and polyurethanes.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used. Resultant film thicknesses may vary as desired.

After forming a film of the basecoat on the substrate, the basecoat can be cured or alternatively given a drying step in which solvent is driven out of the basecoat film by heating or an air drying period before application of the clearcoat. Suitable drying conditions may depend, for example, on the particular basecoat composition, and on the ambient humidity if the composition is water-borne.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other, for example, by inhibiting solvent/water evaporation from a lower layer. Moreover, the first topcoat, the second topcoat or both can be the curable coating composition of the present invention. Alternatively, only one of the first topcoat and the second topcoat is formed from the curable coating composition of the present invention.

In this instance, the topcoat that does not comprise the curable coating composition of the present invention can include any crosslinkable coating composition comprising a thermosettable coating material and a curing agent.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne.

The film-forming composition of the present invention when employed as a second topcoat coating composition can be applied as described above for the first topcoat by any conventional coating application technique. Curing conditions can be those described above for the topcoat.

The curable film-forming compositions of the present invention, after being applied to a substrate as a coating and after curing, demonstrate equivalent or improved mar and scratch resistance as measured by the CROCKMETER TEST, compared to a similar film-forming composition that does not contain particles. By "similar film-forming composition" is meant a film-forming composition that contains a similar crosslinking agent and a similar polymer having a functional group equivalent weight less than 380 g/equivalent based on resin solids of the polymer itself; i.e., having higher functionality than the polymer used in the curable film-forming compositions of the present invention. By "similar polymer" is meant a polymer having a comparable monomer content, with the functional monomers replaced with other monomers that will allow for a functional group equivalent weight less than 380 g/equivalent and comparable number average molecular weight, weight average molecular weight, acid value, and glass transition temperature relative to the polymer used in the composition of the present invention.

The CROCKMETER TEST as used to measure the mar and scratch resistance of the cured film-forming compositions of the present invention is performed as follows: coated panels are subjected to mar and scratch testing by linearly scratching the coated surface with a weighted abrasive paper for ten double rubs using an Atlas AATCC CROCKMETER, Model CM-5, available from Atlas Electric Devices Company of Chicago, Ill. The abrasive paper used was 3M 281Q WETORDRY PRODUCTION 9 micron polishing paper sheets, which are commercially available from 3M Company of St. Paul, Minn.

The present invention will now be described in the following examples. The following examples are provided for illustrative purposes only. It is noted that the various polymers, additives, etc., as used in the examples are merely representative of any like components known to those skilled in the art to serve analogous roles.

Example A

An acrylic polyol was prepared from the following ingredients:

| Ingredient | Wt in g |
| --- | --- |
| Charge 1 | |
| CARDURA E10 P[1] | 917.5 |
| SOLVESSO 150[2] | 100.0 |
| Charge 2 | |
| di-t-amyl peroxide | 112.0 |
| SOLVESSO 150 | 208.9 |
| Charge 3 | |
| SOLVESSO 150 | 15.0 |
| Hydroxyethyl methacrylate | 512.5 |
| Styrene | 472.5 |
| Acrylic acid | 300.0 |
| Butyl acrylate | 297.4 |
| Charge 4 | |
| DOWANOL PM acetate[3] | 500.0 |

[1]Glycidyl ether of neodecanoic acid available from Hexion Specialty Chemicals, Inc.
[2]Mixed aromatics solvent available from ExxonMobil Corporation.
[3]1-methoxy-2-acetoxypropane available from Dow Chemical Company.

Charge 1 was added to a suitable reactor equipped with an overhead stirrer, thermocouple, condenser, and $N_2$ inlet. The charge was placed under an $N_2$ blanket and heated to reflux (175° C.). Charges 2 and 3 were premixed. The addition of both these charges were begun at the same time and added over 180 minutes. At the completion of Charges 2 and 3 the reaction temperature was 175° C. The reaction mixture was held at this temperature for 1 hour, then cooled to 120° C. Charge 4 was then added to the reaction mixture to reduce it to final solids. The resulting material was found to have a measured solids content of (110° C., 1 hr) of 75.5 percent, a viscosity of Z3+ on the Gardner-Holt scale, an acid value of 6.0 mg KOH/g resin, a hydroxyl value on solution of 127.2 mg KOH/g resin (equal to 333 g resin/OH equiv on resin solids adjusted on the basis of measured resin solids) and a $M_w$ of 3723 and a $M_n$ of 1721 as determined by gel permeation chromatography vs. a polystyrene standard.

Example B

An acrylic polyol was prepared from the following ingredients:

| Ingredient | Wt in g |
|---|---|
| Charge 1 | |
| CARDURA E10 P | 1027.6 |
| SOLVESSO 150 | 112.0 |
| Charge 2 | |
| di-t-amyl peroxide | 133.0 |
| SOLVESSO 150 | 234.0 |
| Charge 3 | |
| SOLVESSO 150 | 16.8 |
| Hydroxyethyl methacrylate | 400.4 |
| Styrene | 529.2 |
| Acrylic acid | 324.8 |
| Butyl acrylate | 344.4 |
| Butyl methacrylate | 173.6 |
| Charge 4 | |
| SOLVESSO 100 | 560.00 |

Charge 1 was added to a suitable reactor equipped with an overhead stirrer, thermocouple, condenser, Dean-Stark trap with solvent return and $N_2$ inlet. The charge was placed under an $N_2$ blanket and heated to reflux (175° C.). Charges 2 and 3 were premixed. The addition of both these charges was begun at the same time. Charge 2 was added over a period of 190 minutes; Charge 3 was added over a period of 180 minutes. At the completion of Charge 2 the reaction temperature was 176° C. The reaction mixture was held at this temperature for 1 hour, then cooled to 120° C. Charge 4 was then added to the reaction mixture to reduce it to final solids. The resulting material was found to have a measured solids content of (110° C., 1 hr) of 73.9 percent, a viscosity of Z1 on the Gardner-Holt scale, an acid value of 4.8 mg KOH/g resin, a hydroxyl value on solution of 108.5 mg KOH/g resin (equal to 382 g resin/OH equiv on resin solids adjusted on the basis of measured resin solids) and a Mw of 3829 and a Mn of 1796 as determined by gel permeation chromatography vs. a polystyrene standard.

Example C

An acrylic polyol was prepared from the following ingredients:

| Ingredient | Wt in g |
|---|---|
| Charge 1 | |
| CARDURA E10 P | 1027.6 |
| SOLVESSO 150 | 112.0 |
| Charge 2 | |
| di-t-amyl peroxide | 133.0 |
| SOLVESSO 150 | 234.0 |
| Charge 3 | |
| SOLVESSO 150 | 16.8 |
| Hydroxyethyl methacrylate | 296.8 |
| Styrene | 529.2 |
| Acrylic acid | 324.8 |
| Butyl acrylate | 344.4 |
| Butyl methacrylate | 277.2 |
| Charge 4 | |
| SOLVESSO 100 | 560.00 |

Charge 1 was added to a suitable reactor equipped with an overhead stirrer, thermocouple, condenser, Dean-Stark trap with solvent return and $N_2$ inlet. The charge was placed under an $N_2$ blanket and heated to reflux (175° C.). Charges 2 and 3 were premixed. The addition of both these charges was begun at the same time. Charge 2 was added over a period of 190 minutes; Charge 3 was added over a period of 180 minutes. At the completion of Charge 2 the reaction temperature was 176° C. The reaction mixture was held at this temperature for 1 hour, then cooled to 120° C. Charge 4 was then added to the reaction mixture to reduce it to final solids. The resulting material was found to have a measured solids content of (110° C., 1 hr) of 73.7 percent, a viscosity of Z– on the Gardner-Holt scale, an acid value of 5.0 mg KOH/g resin, a hydroxyl value on solution of 95.8 mg KOH/g resin solution (equal to 432 g resin/OH equiv on resin solids adjusted on the basis of measured resin solids) and a $M_w$ of 3852 and a $M_n$ of 1730 as determined by gel permeation chromatography vs. a polystyrene standard.

Example D

A silica dispersion was prepared from the following ingredients:

| Ingredient | Wt in g |
|---|---|
| Charge 1 | |
| SNOWTEX-O[4] | 750.0 |
| Charge 2 | |
| Isopropanol | 678.0 |
| Charge 3 | |
| Acryloxypropyltrimethoxysilane | 37.5 |
| Charge 4 | |
| Butoxyethanol | 1500.0 |
| Charge 5 | |
| Octyltriethoxysilane | 7.5 |
| Charge 6 | |
| Dibutyltindilaurate | 1.5 |

[4]Colloidal silica solution in $H_2O$, available from Nissan Chemical Industries, Ltd.

A 5-liter flask equipped with a stirrer, thermometer, and addition funnel was set for reflux/distillation and Charge 1 is added. The contents of the flask were then heated to reflux (95-98° C.) and 81.8 g $H_2O$ is removed. The reactor was set for total reflux and the more concentrated dispersion cooled to 30-40° C. Charges 2, 3 and 4 were then added. The mixture is stirred for one hour with no additional heating and then checked for unreacted acryloxypropyl trimethoxysilane by gas chromatography. The flask was then configured for distillation, the reaction mixture heated to reflux (84°-90° C.), and 678 g of volatiles removed under atmospheric distillation. Vacuum was then applied and 854 g of additional material was removed. The contents of the flask are then cooled to room temperature with stirring. Charges 5 and 6 were then added to the reactor, and the reaction mixture was heated to 80° C. and held for 6 hours. The final material was a fluid, translucent liquid with a measured solids (110° C., 1 hr) of 15.3 percent and a measured water content (Karl-Fischer titration) of 0.037 percent.

Example 1

A formula base mix was prepared by combining the following ingredients in an appropriate container:

| Ingredient | Wt in g |
|---|---|
| Butyl acetate | 120.0 |
| Xylene | 300.0 |
| Tridecyl alcohol | 36.0 |
| TINUVIN 928[5] | 18.0 |
| TINUVIN 292[6] | 9.6 |
| TINUVIN 400[7] | 14.2 |
| BYK 337[8] | 1.2 |
| LAROTACT LR 9018[9] | 72.0 |

[5]Benzotriazole UV absorber available from Ciba Specialty Chemicals Corporation.
[6]Hindered amine light stabilizer available from Ciba Specialty Chemicals Corporation.
[7]Triazine UV absorber available from Ciba Specialty Chemicals Corporation.
[8]Polyether modified polydimethylsiloxane additive available from BYK-Chemie USA Inc.
[9]Tris carbamoyltriazine available from BASF Corporation.

Examples 2-5

Clearcoat compositions were prepared according to the formulas in Table 1:

TABLE 1

| | Ex. 2 | Ex. 3 | Ex. 4 | Ex. 5 |
|---|---|---|---|---|
| Base mix of Ex. 1 | 33.3 | 33.3 | 33.3 | 33.3 |
| Acrylic polyol of Ex. A | 59.7 | 59.7 | | |
| Acrylic polyol of Ex. B | | | 61.5 | |
| Acrylic polyol of Ex. C | | | | 61.7 |
| CYMEL 202[10] | 28.0 | | | |
| RESIMENE 741 (R741)[11] | | 25.5 | 25.5 | 25.5 |
| Dodecylbenzene sulfonic acid | 0.5 | 0.5 | 0.5 | 0.5 |
| SOLVESSO 100 | 10.7 | 6.0 | 2.9 | |

[10]Partially alkylated melamine-formaldehyde resin available from Cytec Industries, Inc.
[11]Partially alkylated melamine-formaldehyde resin available from INEOS Americas LLC.

In Examples 2-4, the SOLVESSO 100 component was added in an amount to reduce the clearcoat composition to a #4 Ford cup viscosity of 30-32 seconds. Since the viscosity of Example 5 already fell within that range, no reduction was necessary.

Examples 6-11

Clearcoat compositions comprising the silica dispersion of Example D were prepared according to the formulas in Table 2:

TABLE 2

| | Ex. 6 | Ex. 7 | Ex. 8 | Ex. 9 | Ex. 10 | Ex. 11 |
|---|---|---|---|---|---|---|
| Clearcoat of Ex. 2 | 35.7 | 35.7 | | | | |
| Clearcoat of Ex. 3 | | | 35.3 | 35.3 | | |
| Clearcoat of Ex. 4 | | | | | 34.0 | 34.0 |
| Silica dispersion of Ex. D | 1.18 | 2.35 | 1.18 | 2.35 | 1.18 | 2.35 |

Examples 2-11 were drawn down with a wire wound draw-down bar (stamped 70) on cold rolled steel test panels (4×12 inches) coated with ED5051 black electrocoat available from PPG Industries, Inc. The test panels are available as APR28215 from ACT Laboratories, Inc. The drawn down coatings were allowed to flash at ambient conditions for 10 minutes, then baked for 30 minutes at 285° F. in an electric oven in a horizontal position. After cure, 20° gloss was measured with a Statistical Novo-Gloss 20° gloss meter, available from Paul N. Gardner Company, Inc. The coated panels were subjected to mar and scratch testing in the CROCKMETER TEST by linearly scratching the coated surface with a weighted abrasive paper for ten double rubs using an Atlas AATCC CROCKMETER, Model CM-5, available from Atlas Electric Devices Company of Chicago, Ill. The abrasive paper used was 3M 281Q WETORDRY™ PRODUCTION™ 9 micron polishing paper sheets, which are commercially available from 3M Company of St. Paul, Minn. 9 micron paper provides a severe test and thus clearly distinguishes differences in film performance. The 20° gloss was measured (using the same gloss meter as that used for the initial 20° gloss) on the scratched area of each test panel. The scratch results are reported as the percent of the initial gloss retained after scratch testing using the following calculation: 100%*scratched gloss÷initial gloss. Higher values for percent of gloss retained are desirable. The results are summarized in Table 3.

TABLE 3

| | Initial gloss | 9 micron scratch gloss | % 9 micron retained gloss |
|---|---|---|---|
| Ex. 2 (Control, 333 eq wt polyol, CYMEL 202, no silica) | 97 | 55 | 57 |
| Ex. 3 (333 eq wt polyol, R741, no silica) | 95 | 40 | 42 |
| Ex. 6 (333 eq wt polyol, R741, 1% silica on solids) | 93 | 77 | 83 |
| Ex. 7 (333 eq wt polyol, R741, 2% silica on solids) | 94 | 83 | 88 |
| Ex. 4 (382 eq wt polyol, R741, no silica) | 95 | 31 | 33 |
| Ex. 8 (382 eq wt polyol, R741, 1% silica on solids) | 93 | 81 | 87 |
| Ex. 9 (382 eq wt polyol, R741, 2% silica on solids) | 93 | 80 | 86 |
| Ex. 5 (432 eq wt polyol, R741, no silica) | 94 | 20 | 21 |
| Ex. 10 (432 eq wt polyol, R741, 1% silica on solids) | 93 | 73 | 78 |
| Ex. 11 (432 eq wt polyol, R741, 2% silica on solids) | 93 | 74 | 80 |

Example 2 is provided as a control. Example 3 is similar to Example 2, except for the melamine crosslinker (RESIMENE 741 substituted for CYMEL 202). RESIMENE 741 crosslinker is often associated with better appearance, but worse scratch resistance. Incorporation of the silica dispersion of Example D at two levels (1 and 2 percent of resin solids) into the formula of Example 3 (Examples 6 and 7) brings the scratch resistance to levels that exceed the control in Example 2. Examples 4 and 5 (compared to Example 3) illustrate the negative effect of reducing the hydroxyl functionality of the resin on scratch resistance. Examples 8, 9, 10, and 11 illustrate the ability of the silica dispersion of Example D to bring the scratch resistance to levels that significantly exceed the control of Example 2.

A second set of drawdowns were conducted using several of the clearcoat compositions of the above examples to evaluate the various clearcoats for appearance as well as scratch resistance. Because at equal resin hydroxyl equivalent weight there was very little difference in the scratch resistance of the clearcoats comprising 1 percent and 2 percent on solids of the silica dispersion of Example D, only the clearcoats comprising 1 percent on solids were retested. In this experiment, the test panels were prescreened for surface roughness using a Gould SURFANALYZER 150 profilometer. Each panel was screened for roughness ("Ra" value) in three locations (approximately top, middle, and bottom) and an average taken. Analysis using a statistical software package (JMP Version 4, available from SAS Institute, Inc.) showed that the "Ra" values all fell well within six sigma control limits. Further analysis ("Analysis of Variance") with the same software package showed that 100 percent of the variation observed was due to variation in the measurements within a panel and none of the variation was due to differences between the panels themselves. Panels with average "Ra" values between 9.33 and 9.74 were used. The roughness of the panels was controlled in order to minimize to the greatest possible extent the effect of substrate roughness on clearcoat appearance. The dried film thickness (DFT) of the panels was also measured using a Model M11-GAB1.3 PERMASCOPE available from Fischer Technology Inc. The panels were visually ranked for appearance from 1 (best) to 7 (worst). Appearance was judged on the basis of clearcoat smoothness. The data from these drawdowns is presented in Table 4.

TABLE 4

|  | Initial gloss | 9 micron scratch gloss | % 9 micron retained gloss | DFT (mils) | Visual rank |
|---|---|---|---|---|---|
| Ex. 2 (Control, 333 eq wt polyol, CYMEL 202, no silica) | 93 | 59 | 63 | 1.9 | 7 |
| Ex. 3 (333 eq wt polyol, R741, no silica) | 91 | 34 | 37 | 1.9 | 6 |
| Ex. 6 (333 eq wt polyol, R741, 1% silica on solids) | 90 | 69 | 77 | 2.2 | 5 |
| Ex. 4 (382 eq wt polyol, R741, no silica) | 90 | 44 | 49 | 2.0 | 4 |
| Ex. 8 (382 eq wt polyol, R741, 1% silica on solids) | 88 | 77 | 88 | 1.9 | 2 |
| Ex. 5 (432 eq wt polyol, R741, no silica) | 90 | 30 | 33 | 2.1 | 1 |
| Ex. 10 (432 eq wt polyol, R741, 1% silica on solids) | 89 | 74 | 83 | 2.1 | 3 |

Incorporation of the silica dispersion of Example D (Examples 6, 8, and 10) results in scratch resistance that clearly exceeds the control (Example 2). Examples 4, 5, 8, and 10 were very close to each other for appearance and clearly distinguished from Example 2 (Control) and Examples 3 and 6 (lower equivalent weight polyol). The clearcoats with the higher equivalent weight polyols and the silica of Example D (Examples 8 and 10) demonstrate both significantly improved scratch resistance and appearance compared to the Example 2 control and Example 3 with the lower equivalent weight polyol.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. In a curable film-forming composition comprising:
    a) a film-forming resin comprising a polymeric polyol having a hydroxyl equivalent weight greater than 380 g/equivalent based on resin solids of the polymeric polyol itself, and a crosslinking agent reactive with the polymeric polyol; and
    b) a sol of particles suspended in an organic medium, wherein said sol of particles is prepared by a method comprising:
        i) providing a suspension of particles in an aqueous medium;
        ii) adding a first organic liquid compatible with the aqueous medium to form an admixture;
        iii) reacting the particles in the admixture with a first modifying compound, wherein the first modifying compound comprises (1) a group that does not react with the particles and (2) a functional group capable of reacting with functional groups on the particles, wherein (1) and (2) are linked by a linking moiety, and wherein the group that does not react with the particles comprises an ethylenically unsaturated group;
        iv) reacting the particles with a second modifying compound, wherein the second modifying compound is different from the first and comprises a hydrophobic group and a functional group capable of reacting with functional groups on the particles; and
        v) adding a second organic liquid compatible with the liquid portion of the admixture either before or after the particles are reacted with the second modifying compound, wherein the second organic liquid is different from the first organic liquid used in step ii);
    wherein when the second organic liquid is added to the admixture before the particles are reacted with the second modifying compound, the admixture is maintained at a temperature and pressure and for a time sufficient to substantially remove the water and the first organic liquid added in step ii) before reacting the particles with the second modifying compound.

2. The composition according to claim 1, wherein the polymeric polyol has a hydroxyl equivalent weight greater than 400 g/equivalent based on resin solids of the polymeric polyol itself.

3. The composition according to claim 1, wherein the polymeric polyol comprises an acrylic polyol.

4. The composition according to claim 1, wherein the crosslinking agent comprises an aminoplast.

5. The composition according to claim 1, wherein said composition, after application to a substrate as a coating and after curing, demonstrates improved mar and scratch resistance as measured by the CROCKMETER TEST, compared to a similar film-forming composition that does not contain particles.

6. The composition according to claim 1, wherein the polymeric polyol is present in the film-forming resin of a) in an amount of 10 to 90 percent by weight, based on the total weight of resin solids in the film-forming resin.

7. The composition according to claim 1, wherein the crosslinking agent is present in the film-forming resin of a) in an amount of 10 to 90 percent by weight, based on the total weight of resin solids in the film-forming resin.

8. In a curable film-forming composition comprising:
a) a film-forming resin comprising a polymeric polyol having a hydroxyl equivalent weight greater than 380 g/equivalent based on resin solids of the polymeric polyol itself, and a crosslinking agent reactive with the polymeric polyol; and
b) a sol of particles suspended in an organic medium, said sol of particles comprising particles that have been reacted with:
  i) a first modifying compound comprising (1) a group that does not react with the particles and (2) a functional group capable of reacting with functional groups on the particles, wherein (1) and (2) are linked by a linking moiety, and wherein the group that does not react with the particles comprises an ethylenically unsaturated group; and
  ii) a second modifying compound, wherein the second modifying compound is different from the first and comprises a hydrophobic group and a functional group capable of reacting with functional groups on the particles.

9. The composition according to claim 8, wherein the polymeric polyol has a hydroxyl equivalent weight greater than 400 g/equivalent based on resin solids of the polymeric polyol itself.

10. The composition according to claim 8, wherein the polymeric polyol comprises an acrylic polyol.

11. The composition according to claim 8, wherein the crosslinking agent comprises an aminoplast.

12. The composition according to claim 8, wherein said composition, after application to a substrate as a coating and after curing, demonstrates improved mar and scratch resistance as measured by the CROCKMETER TEST, compared to a similar film-forming composition that does not contain particles.

13. The composition according to claim 8, wherein the polymeric polyol is present in the film-forming resin of a) in an amount of 10 to 90 percent by weight, based on the total weight of resin solids in the film-forming resin.

14. The composition according to claim 8, wherein the crosslinking agent is present in the film-forming resin of a) in an amount of 10 to 90 percent by weight, based on the total weight of resin solids in the film-forming resin.

15. In a curable film-forming composition comprising:
a) a film-forming resin comprising a polymeric polyol having a hydroxyl equivalent weight greater than 380 g/equivalent based on resin solids of the polymeric polyol itself, and a crosslinking agent reactive with the polymeric polyol; and
b) a sol of particles suspended in an organic medium, wherein said sol of particles is prepared by a method comprising:
  i) providing a suspension of particles in an aqueous medium;
  ii) adding a first organic liquid compatible with the aqueous medium to form an admixture;
  iii) reacting the particles in the admixture with a first modifying compound, wherein the first modifying compound comprises (1) a group that does not react with the particles and (2) a functional group capable of reacting with functional groups on the particles, wherein (1) and (2) are linked by a linking moiety, and wherein the group that does not react with the particles comprises an ethylenically unsaturated group;
  iv) reacting the particles with a second modifying compound, wherein the second modifying compound is different from the first and comprises a hydrophobic group and a functional group capable of reacting with functional groups on the particles; and
  v) adding a second organic liquid compatible with the liquid portion of the admixture either before or after the particles are reacted with the second modifying compound, wherein the second organic liquid is different from the first organic liquid used in step ii);
wherein when the second organic liquid is added to the admixture before the particles are reacted with the second modifying compound, the admixture is maintained at a temperature and pressure and for a time sufficient to substantially remove the water and the first organic liquid added in step ii) before reacting the particles with the second modifying compound.

16. The composition according to claim 15, wherein the polymer has a functional group equivalent weight greater than 400 g/equivalent based on resin solids of the polymer itself.

17. The composition according to claim 15, wherein said composition, after application to a substrate as a coating and after curing, demonstrates improved mar and scratch resistance as measured by the CROCKMETER TEST, compared to a similar film-forming composition that does not contain particles.

18. The composition according to claim 15, wherein the polymer is present in the film-forming resin of a) in an amount of 10 to 90 percent by weight, based on the total weight of resin solids in the film-forming resin.

19. The composition according to claim 15, wherein the crosslinking agent is present in the film-forming resin of a) in an amount of 10 to 90 percent by weight, based on the total weight of resin solids in the film-forming resin.

20. In a curable film-forming composition comprising:
a) a film-forming resin comprising a polymeric polyol having a hydroxyl equivalent weight greater than 380 g/equivalent based on resin solids of the polymeric polyol itself, and a crosslinking agent reactive with the polymeric polyol; and
b) a sol of particles suspended in an organic medium, said sol of particles comprising particles that have been reacted with:
  i) a first modifying compound comprising (1) a group that does not react with the particles and (2) a functional group capable of reacting with functional groups on the particles, wherein (1) and (2) are linked by a linking moiety, and wherein the group that does not react with the particles comprises an ethylenically unsaturated group; and
  ii) a second modifying compound, wherein the second modifying compound is different from the first and comprises a hydrophobic group and a functional group capable of reacting with functional groups on the particles.

* * * * *